United States Patent [19]

Michioka et al.

[11] Patent Number: 5,230,671
[45] Date of Patent: Jul. 27, 1993

[54] AUTOMATIC TRANSMISSION

[75] Inventors: Hirofumi Michioka; Yuji Hayashi; Koichi Hayasaki, all of Kanagawa, Japan

[73] Assignee: Nissan Motor Co., Ltd., Yokohama, Japan

[21] Appl. No.: 917,228

[22] Filed: Jul. 23, 1992

[30] Foreign Application Priority Data

Jul. 26, 1991 [JP] Japan .................. 3-208859

[51] Int. Cl.$^5$ .............................................. F16H 3/62
[52] U.S. Cl. ...................................................... 475/286
[58] Field of Search ......................................... 475/286

[56] References Cited

U.S. PATENT DOCUMENTS

| | | | |
|---|---|---|---|
| 3,941,013 | 3/1976 | Miller | 475/286 X |
| 3,996,817 | 12/1976 | Winzeler | 475/286 X |
| 4,046,031 | 9/1977 | Ott et al. | 475/286 X |
| 4,089,238 | 5/1978 | Forster et al. | 475/286 X |
| 4,172,393 | 10/1979 | Miller | 475/286 X |
| 4,683,776 | 8/1987 | Klemen | 475/286 |
| 4,935,872 | 6/1990 | Benford et al. | 364/424.1 |
| 5,106,352 | 4/1992 | Lepelletier | 475/286 X |

FOREIGN PATENT DOCUMENTS 63-235728 9/1988 Japan .
1-80853 5/1989 Japan .

OTHER PUBLICATIONS

Nissan Repair Manual (L4N71B and E4N71B), 1982, p. 7.
Toyota Repair Manual (A340E), 1985.
Toyota Repair Manual (A540H).
Jaguar XJ6 Repair Manual (ZF4HP-22), p. 44-2.

Primary Examiner—Dirk Wright
Attorney, Agent, or Firm—Foley & Lardner

[57] ABSTRACT

An automatic transmission includes a planetary gear system which are coaxially mounted on an intermediate shaft having a first end supported by an input shaft and a second end supported by an output shaft. For example, the planetary gear system includes three planetary gear sets which are all mounted on the intermediate shaft, and an engaging device group includes a combination of first and second clutches and a first brake which are all placed around the input shaft, and a combination of second and third brakes which are placed around the planetary gear sets. The three planetary gear sets are tightly arranged, leaving little or no intervening spaces, between both ends of the intermediate shaft. No clutches and brakes are interposed among the planetary gear sets. Therefore, it is possible to decrease the length of the intermediate shaft, and to reduce gear noises by improving the flexural rigidity of the intermediate shaft.

17 Claims, 4 Drawing Sheets

| SPEEDS | ENGAGING DEVICES | | | | |
|---|---|---|---|---|---|
| | C₁ | C₂ | B₁ | B₂ | B₃ |
| 1 | ○ | | | | ○ |
| 2 | ○ | | | ○ | |
| 3 | ○ | | ○ | | |
| 4 | ○ | ○ | | | |
| 5 | | ○ | ○ | | |
| R | | | ○ | | ○ |

AUTOMATIC TRANSMISSION

BACKGROUND OF THE INVENTION

The present invention relates to an automatic transmission.

One conventional automatic transmission (Toyota A340E) includes input and output shafts aligned in a line, and an intermediate shaft both ends of which are supported by the input and output shafts, respectively. This transmission further includes one planetary gear set mounted on the input shaft, two other planetary gear sets mounted on the output shaft, and a group of clutches and brakes which are distributed over the input, intermediate and output shafts. In this transmission, each of the input and output shafts is supported like a cantilever because one shaft end is occupied by one or more planetary gear sets, and not supported. This transmission, therefore, includes a center support wall supporting the intermediate shaft. Furthermore, the clutches and brakes are arranged axially. These features increase the axial length of the automatic transmission, and tend to increase gear noises by decreasing the flexural rigidities of the input and output shafts.

SUMMARY OF THE INVENTION

It is an object of the present invention to provide a compact automatic transmission which can reduce the axial dimension of the transmission, and improve the rigidity of the transmission.

According to the present invention, an automatic transmission comprises input and output shafts which are aligned with each other, an intermediate shaft having a first end rotatably supported by one end of the input shaft and a second end rotatably supported by one end of the output shaft, an engaging device group and a planetary gear system. The engaging device group comprises at least first and second clutches which are both disposed around the input shaft, and the planetary gear system comprises at least first and second planetary gear sets which are both mounted on the intermediate shaft. Preferably, all the clutches of the automatic transmission are placed around the input shaft, and all the planetary gear sets are placed around the intermediate shaft. In this transmission, it is possible to eliminate the center support wall supporting the intermediate shaft, and decrease the axial length of the intermediate shaft.

DETAILED DESCRIPTION OF THE INVENTION

FIGS. 1-4 show an automatic transmission according to one embodiment of the present invention.

Figure 2:
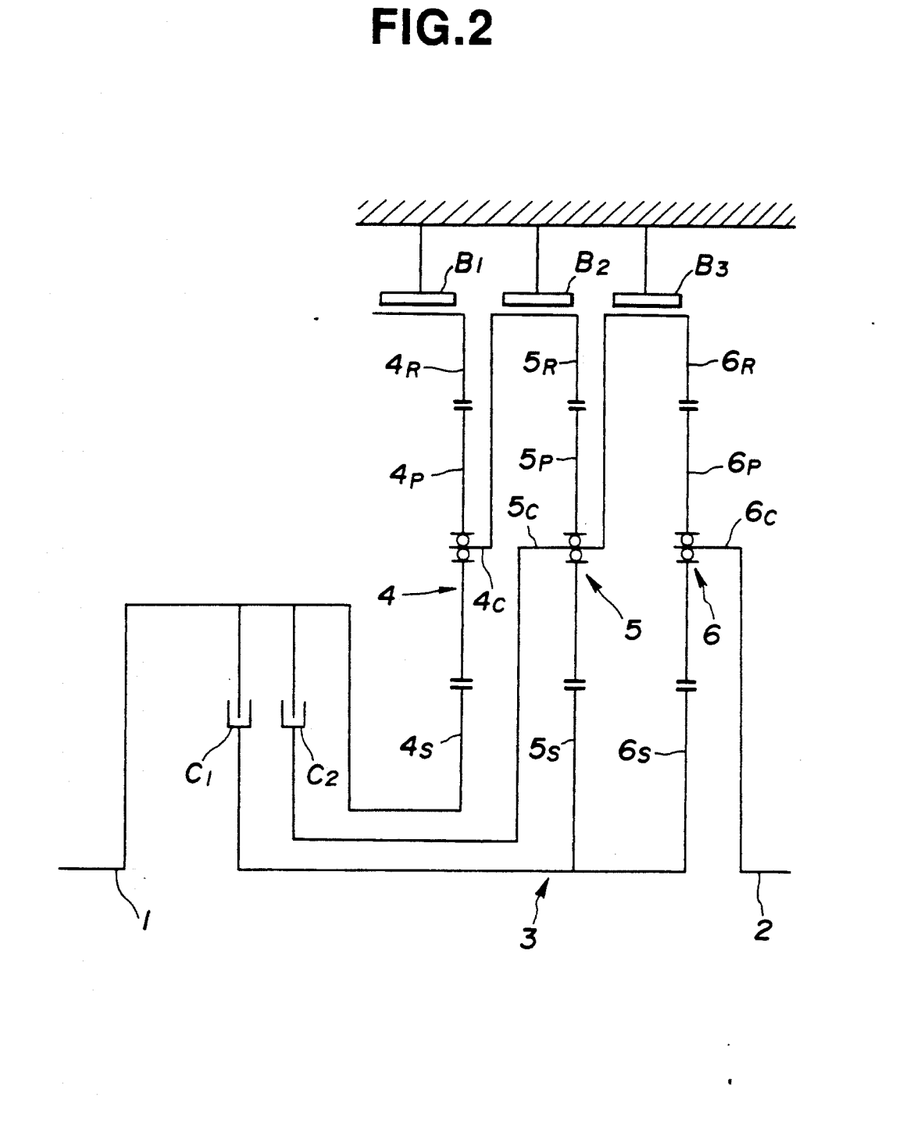
FIG. 2 is a skeleton diagram schematically showing the automatic transmission of this embodiment.

As shown in the skeleton diagram of FIG. 2, the automatic transmission includes an input member 1 in the form of a shaft, an output member 2 also in the form of a shaft, and an intermediate shaft 3. These shafts 1, 2 and 3 are arranged end to end in a straight line, and the intermediate shaft 3 is placed between the input and output shafts 1 and 2. The input shaft 1 has an inner end facing toward the output shaft 2, and an outer end which is more remote from the output shaft 2 than the inner end. The output shaft 2 has an inner end facing toward the input shaft 1, and an outer end which is more remote from the input shaft 1 than the input end of the output shaft 2. The intermediate shaft 3 has a first end confronting the inner end of the input shaft 1, and a second end confronting the inner end of the output shaft 2.

The automatic transmission further includes a planetary gear system which is arranged between the input and output shafts 1 and 2, and which is coaxial with the input, intermediate and output shafts 1, 3 and 2. In this embodiment, the planetary gear system includes a first planetary gear set 4, a second planetary gear set 5 and a third planetary gear set 6. The planetary gear system is connected between the input and output shafts 1 and 2, to transmit rotation therebetween.

The first planetary gear set 4 includes a first sun gear 4S, a first ring gear 4R, and a first planet carrier 4C rotatably carrying a set of first pinions 4P each of which is in direct engagement with both of the sun gear 4S and the ring gear 4R. Similarly, the second planetary gear set 5 includes a second sun gear 5S, a second ring gear 5R, and a second planet carrier 5C rotatably carrying second pinions 5P. The third planetary gear set 6 includes a third sun gear 6S, a third ring gear 6R and a third planet carrier 6C rotatably carrying third pinions 6P. In this embodiment, each of the first, second and third planetary gear sets 4, 5 and 6 is a simple planetary gear set of a single pinion type.

The automatic transmission shown in FIG. 2 further includes a selective engaging device group which, in this embodiment, consists of first and second clutches C1 and C2, and first, second and third brakes B1, B2 and B3.

The first sun gear 4S and the input shaft 1 are connected together so that they always rotate together. The second and third sun gears 5S and 6S are also connected together so as to prevent relative rotation therebetween. The input shaft 1 is connected with the second and third sun gears 5S and 6S through the first clutch C1. The second clutch C2 is connected between the second carrier 5C and the input shaft 1. The second clutch C2 can connect the second carrier 5C and the input shaft 1 together, and disconnect them one from the other. The second carrier 5C and the third ring gear 6R are connected together so that they rotate together. The first brake B1 is connected between the first ring gear 4R and a stationary member. The first brake B1 can hold the first ring gear 4R stationary. The second brake B2 can hold stationary the first carrier 4C and the second ring gear 5R which are connected together. The third brake B3 can hold stationary the second carrier 5C and the third ring gear 6R which are connected together. The third carrier 6C and the output shaft 2 are connected together.

Figure 4:
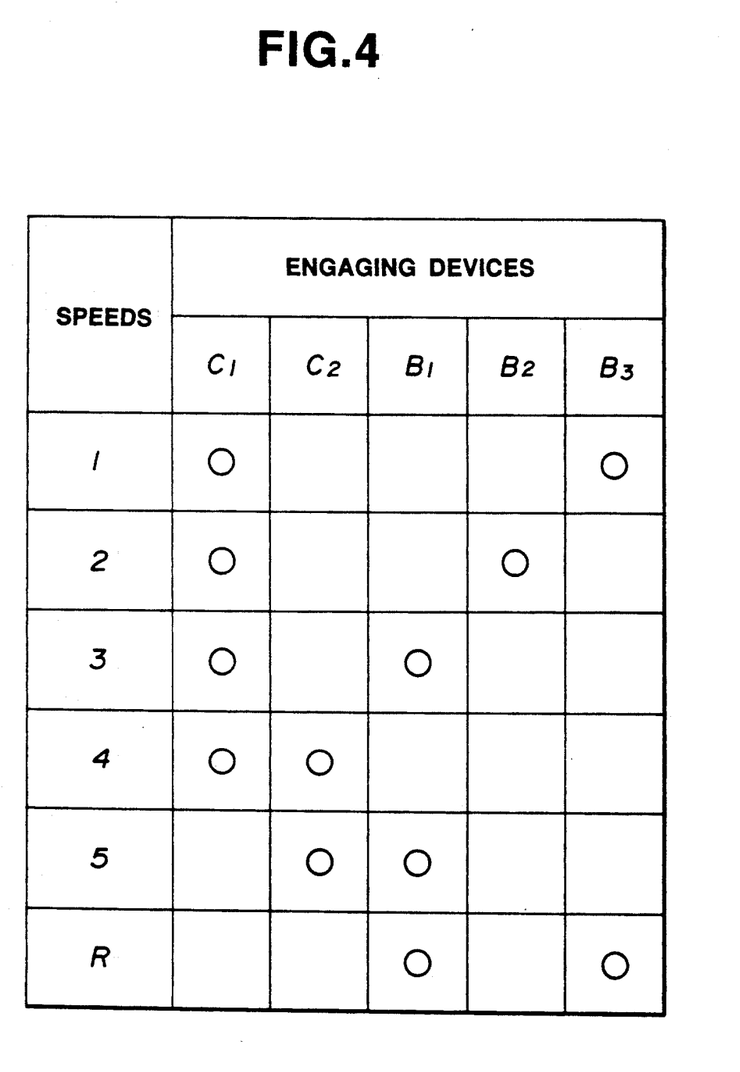
FIG. 4 is a table showing clutches and brakes to be engaged to obtain five forward speeds and one reverse speed with this automatic transmission.

The automatic transmission further includes a shift control system (or shift control means) which is connected with each of the selective engaging devices C1, C2, B1, B2 and B3, and arranged to provide first through fifth forward speeds and a reverse speed by engaging and disengaging the selective engaging devices as shown in a table of FIG. 4. In this table, engagement of any of the devices is shown by a small circle. This shift control system obtains each speed by engaging two of the five devices C1, C2, and B1-B3, and holding the remaining three disengaged. Each shift from one speed to the next speed is achieved by bringing one device from the engaged state to the disengaged state and another device from the disengaged state to the engaged state. During this, still another device is kept engaged. To effect an upshift from the first speed to the second speed, for example, the shift control system disengages the third brake B3 and instead engages the second brake B2. The first clutch C1 remains engaged, and needs not be operated.

Figure 3:
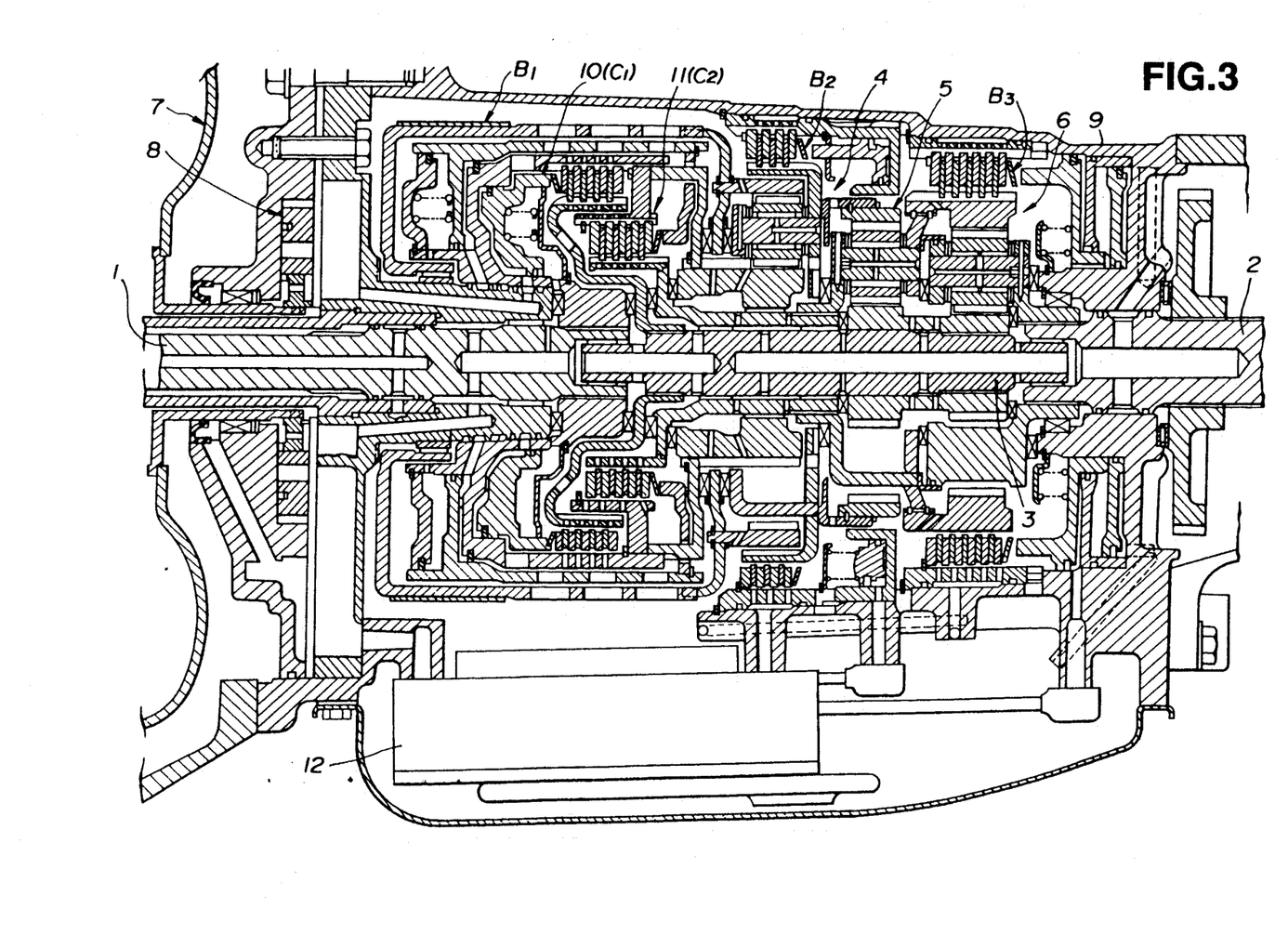
FIG. 3 is a sectional view showing almost the whole of the automatic transmission of this embodiment.

FIG. 3 shows the automatic transmission according to this embodiment of the present invention more concretely. As shown in FIG. 3, the axes of the input shaft 1, the intermediate shaft 3 and the output shaft 2 are all on a common straight line which is a center axis of the transmission. The input shaft 1 extends leftward as viewed in FIG. 3, into a torque converter 7 (FIG. 3 shows only a part of the torque converter 7). The automatic transmission shown in FIG. 2 is combined with the torque converter 7 to form a torque converter automatic transmission. An oil pump 8 is formed around a middle portion of the input shaft 1.

In the example shown in FIG. 3, each of the first and second clutches C1 and C2 are in the form of a multiple disc clutch 10 or 11. The first and second multiple disc clutches 10 and 11, and the first brake (band brake) B1 are all located around the input shaft 1 near the inner end (the right end as viewed in FIG. 3) of the input shaft 1.

The intermediate shaft 3 has the first (left) end which is rotatably supported by the inner (right) end of the input shaft 1, and the second (right) end which is rotatably supported by the inner (left) end of the output shaft 2. The first, second and third planetary gear sets 4, 5 and 6 are arranged around the intermediate shaft 3 between the first and second ends of the intermediate shaft 3. The second planetary gear set 5 is placed axially between the first and third planetary gear sets 4 and 6. The first planetary gear set 4 is axially between the first (left) end of the intermediate shaft 3 and the second planetary gear set 5. The third planetary gear set 6 is axially between the second planetary gear set 5 and the second (right) end of the intermediate shaft 3. The second and third brakes B2 and B3 are arranged around these planetary gear sets. The output shaft 2 extends rightward as viewed in FIG. 3. There are provided, around the output shaft 2, a piston of the third brake B3 and a support wall.

This automatic transmission shown in FIG. 3 further includes a transmission case 9, and a control valve assembly 12 of the shift control system for supplying oil to each of oil passages shown in FIG. 3.

Figure 1:
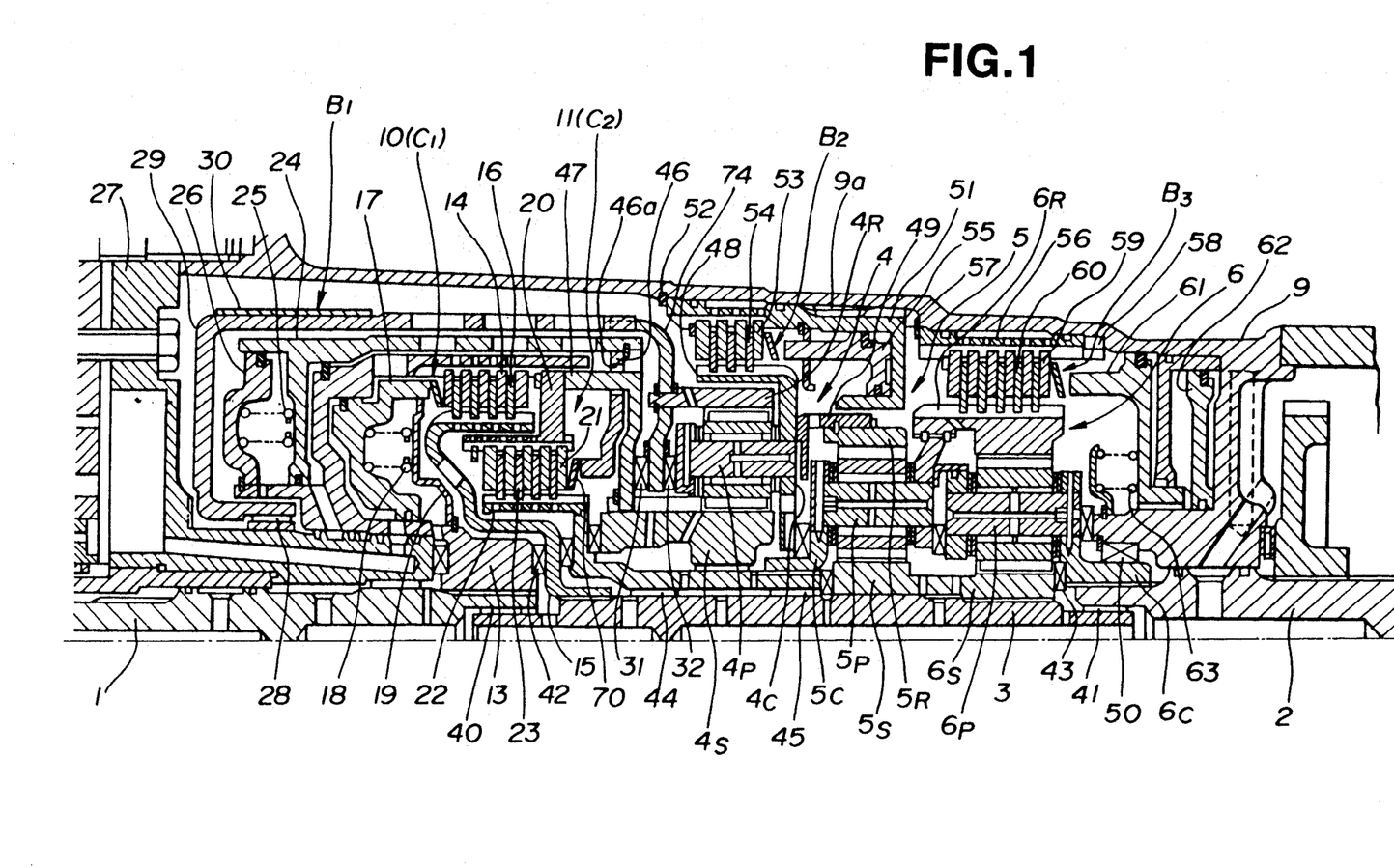
FIG. 1 is a sectional view showing a part of an automatic transmission according to one embodiment of the present invention.

FIG. 1 shows the automatic transmission of FIG. 3 more in detail.

The first multiple disc clutch 10 (C1) includes a first clutch drum 13, and a first clutch pack of first external and internal clutch plates 14 and 16 which are arranged alternately. The first clutch drum 13 is mounted on, and splined (coupled by means of one or more splines) to, the input shaft 1. The first external clutch plates 14 are engaged with the clutch drum 13. The first internal clutch plates 16 are engaged with a first clutch hub 15 (corresponding to a first driven member) which is mounted on, and splined to, the intermediate shaft 3. The first clutch 10 (C1) further includes a first clutch piston 17 for pushing the alternating first clutch pack of the clutch plates in the right direction as viewed in FIG. 1 to engage the first clutch 10 by receiving an oil pressure, a spring 18 for urging the piston 17 in a release (left) direction, and a retainer 19 for supporting the spring 18. The first clutch piston 17 has a pushing portion for pushing the first clutch pack from the left side and a pressure receiving portion for receiving the clutch fluid pressure. The pushing portion, pressure receiving portion and the spring 18 of the first clutch 10 are all located on a first (left) side of the first clutch pack.

The second multiple disc clutch 11 (C2) includes a second clutch drum 20, and a second clutch pack of second external and internal clutch plates 21 and 23. The second clutch drum 20 is received in, and splined to, the first clutch drum 13. The second external clutch plates 21 are engaged with the second clutch drum 20. The second internal clutch plates 23 are engaged with a second clutch hub 22 (corresponding to a second driven member) which is coupled with the second carrier 5C by means of one or more splines. The second clutch 11 (C2) further includes a second clutch piston 24 for pushing the second clutch pack of the clutch plates 21 and 23 in the left direction to engage the second clutch 11 by receiving a fluid pressure, and a spring 25 for urging the second piston 24 in the release (right) direction.

In the automatic transmission according to this embodiment of the invention, the first and second clutches 10 and 11 are arranged radially so that one is surrounded by the other. In the example shown in FIG. 1, the second clutch pack of the second clutch plates 21 and 22 is surrounded by the first clutch pack of the first clutch plates 14 and 16. The first and second clutch packs are placed axially between the pushing portion of the first piston 17 and a pushing portion of the second piston 24. Therefore, the axial dimension of this clutch structure is significantly reduced as compared with a conventional clutch structure in which the first and second clutches are arranged axially. The clutch structure shown in FIG. 1 can reduce the axial size and weight of the automatic transmission. The second clutch drum 20 is splined to the inside surface of the first clutch drum 13, so that this clutch structure can be readily assembled.

The second clutch 11 further includes an end member 26 which supports the spring 25 and defines a centrifugal fluid chamber for producing a centrifugal oil pressure. The second piston 24 has the pushing portion for pushing the second clutch pack from a second (right) side, a cylindrical portion surrounding the first clutch drum 13, and a pressure receiving center portion receiving the clutch fluid pressure. The pushing portion of the second clutch piston 24 is located on the second (right) side of the second clutch pack, and the pressure receiving portion of the second clutch piston 24 is on the first (left) side of the second clutch pack.

The pressure receiving center portion of the second clutch piston 24 extends radially inwardly toward the input shaft 1 from the inside surface of the cylindrical portion, and divides the bore of the cylindrical portion of the second clutch piston 24 into a first (left) bore section and a second (right) bore section. The first clutch drum 13 is received in the second bore section. The end member 26 is fit in the first bore section to form the centrifugal fluid chamber in the first bore section between the end member 26 and the pressure receiving portion of the second piston 24. Thus, the second clutch piston 24 has a T-shaped section as shown in FIG. 1. The spring 25 is disposed in the centrifugal fluid chamber.

The first brake (band brake) $B_1$ includes a first brake drum 29 and a brake band 30. The first brake drum 29 has a hub portion supported through a bearing 28 by a stationary support wall 27 for supporting the input shaft 1. The first brake drum 29 further has an outer cylindrical portion which surrounds the second clutch piston 24. The brake band 30 is wrapped around the outer cylindrical portion of the first brake drum 29.

In this way, the first and second clutches 10 ($C_1$) and 11 ($C_2$) and the first brake $B_1$ are compactly arranged on the input shaft 1, so that a sufficient space is left for placing the first, second and third planetary gear sets 4, 5 and 6 around the intermediate shaft 3. Three of the five engaging devices $C_1$, $C_2$ and $B_1$-$B_3$ are located around the input shaft 1, and only the remaining two are arranged around the intermediate shaft 3.

The first clutch drum 13 separates a first clutch fluid pressure chamber formed between the first clutch piston 17 and the first clutch drum 13, from a second clutch fluid pressure chamber formed between the second clutch piston 24 and the first clutch drum 13. Both chambers are located on the first (left) side of the first and second clutch packs. When an oil pressure is supplied to the first chamber, then the first piston 17 moves rectilinearly in a first (rightward) direction and compresses the first clutch pack of the first clutch plates 14 and 16. Therefore, the first clutch 10 transmits an input rotation of the input shaft 1 from the first clutch drum 13 to the first clutch hub 15, which drives the intermediate shaft 3 at an input speed of the input shaft 1. When an oil pressure is supplied to the second pressure chamber, the second clutch piston 24 moves in a second (leftward) direction, and compresses the second clutch pack of the second clutch plates 21 and 23. In this case, the input rotation of the input shaft 1 transmitted to the second clutch drum 20 through the first clutch drum 13 is further transmitted to the second hub 22, which drives the second carrier $5_C$ at the input speed.

When the oil pressure is supplied to the second clutch fluid pressure chamber and the second piston 24 pushes the second clutch pack, the right end of the second piston 24 receives a reaction force which tends to deform the right end of the second piston 24 radially outwardly. This outward force acts as a bending moment, and the left end of the second piston 24 receives a force acting radially inwardly toward the center axis of the transmission. However, the end member 26 and the centrifugal oil pressure in the centrifugal fluid chamber receive this inward force, and prevent the left end of the second piston 24 from being deformed inwardly. Therefore, it is possible to reduce the wall thickness of the second clutch piston 24.

The second clutch piston 24 of this embodiment consists of a main member having the pressure receiving portion and the cylindrical portion surrounding the first clutch drum 13, and a pushing member 46 serving as the pushing portion for pushing the second clutch pack. The pushing member 46 is formed with holes 46a. The holes 46a are arranged in a circle in the manner of radial symmetry. The pushing member 46 has a central portion projecting toward the second clutch pack, and abuts on a dish plate 70 as shown in FIG. 1. The dish plate 70 is disposed between the second clutch pack and the central portion of the pushing member 46.

The structure shown in FIG. 1 further includes a first connecting member 47 which connects the first clutch drum 13 with the first sun gear $4_S$, so that the first sun gear $4_S$ rotates always at the input speed of the input shaft 1. The first connecting member 47 has axially extending arms. Each of the arms is inserted through a unique one of the holes 46a of the pushing member 46, and splined with the first clutch drum 13. The first sun gear $4_S$ hs a hub portion which is fit and engaged in a center hole of the first connecting member 47 so that the first sun gear $4_S$ and the first connecting member 47 rotate together. The pushing member 46 is interposed axially between the first clutch drum 13 on the first (left) side, and the first sun gear $4_S$ on the second (right) side. The arms 47a extends axially from the second side toward the first clutch drum 13 through the holes 46a. In this way, the input rotation of the input shaft 1 is transmitted through the first clutch drum 13 and the first connecting member 47 to the first sun gear $4_S$.

The structure shown in FIG. 1 further includes a second connecting member 74 for connecting the first brake drum 29 with the first ring gear $4_R$. The second connecting member 74 has an outer portion having dents which are interdigitated with dents formed in the (right) end of the outer cylindrical portion of the first clutch drum 29. Therefore, rotation is transmitted between the first brake drum 29 and the second connecting member 74, but no radial force acting in a direction perpendicular to the center axis of the transmission (the up-and-down direction as viewed in FIG. 1) is transmitted. The second connecting member 74 has a middle portion which is connected with the first ring gear $4_R$ so as to prevent relative rotation between the second connecting member 74 and the first ring gear $4_R$. The second connecting member 74 has an inner portion which is supported between first and second thrust bearings 31 and 32 which are spaced axially. The first and second thrust bearings 31 and 32 are supported, respectively, by the first connecting member 47 and the first planet carrier $4_C$. The first and second thrust bearings 31 and 32 are located at a radial position closer to the center axis than the radial position of the first ring gear $4_R$. When the first brake B1 is applied, the brake band 30 prevents rotation of the first brake drum 29, and thereby holds stationary the first ring gear $4_R$ which is connected with the first brake drum 29 so as to prevent relative rotation therebetween by the second connecting member 74.

First and second bearing 40 and 41 are provided on both ends of the intermediate shaft 3, as shown in FIG. 1. The first bearing 40 is interposed between the first (left) end of the intermediate shaft 3 and the inner (right) end of the input shaft 1. The first end of the intermediate shaft 3 is supported by the inner end of the input shaft 1 through the first bearing 40. Similarly, the second end of the intermediate shaft 3 is supported by the inner end of the output shaft 21 through the second bearing 41. In this example, the first end of the intermediate shaft 3 is received in a bore of the input shaft 1, and the first bearing 40 is between the outside surface of the first end of the intermediate shaft 3, and the inside surface of the bore of the input shaft 1. The second end of the intermediate shaft 3 is supported by the inner end of the output shaft 2 through the second bearing 41 in the same manner, as shown in FIG. 1.

As shown in FIG. 1, the first clutch hub 15 has an inner end which is mounted on, and splined to, the intermediate shaft 3 near the first end of the intermediate shaft 3. A first (left) portion of the intermediate shaft 3 near the first end is supported by the first clutch hub member 15, and further through a bearing 42 by the first clutch drum 13 on the input shaft 1. A second (right) portion of the intermediate shaft 3 near the second end is supported by the third sun gear $6_S$, and through a bearing 43 by the third carrier $6_C$ on the output shaft 2. The second clutch hub member 22 is coupled with the second carrier $5_C$ by means of one or more splines. The second clutch hub member 22 is rotatably mounted on the intermediate shaft 3 through bearings 44 and 45. The third sun gear $6_S$ is mounted on, and coupled with the intermediate shaft 3 by means of one or more splines. The second and third sun gears $5_S$ and $6_S$ are connected together to form a single rotary member. Therefore, the second and third sun gears $5_S$ and $6_S$ rotate together with the intermediate shaft 3.

The second brake $B_2$ includes a brake hub 48 which is connected with the first carrier $4_C$, which is further connected with the second ring gear $5_R$ by a connecting member 49. The second planet carrier $5_C$ has a left end splined to the second clutch hub member 22, and a right end connected with the third ring gear $6_R$. The ring gear $6_R$ has an outer portion serving as a brake hub of the third brake $B_3$. The third planet carrier $6_C$ is mounted on, and splined to, the output shaft 2, which is in turn supported on the transmission case 9 through a bearing 50.

The second brake $B_2$ includes a brake drum 51 which is fit in the transmission case 9 and which surrounds the first and second planetary gear sets 4 and 5. The brake drum 51 is fixed to the transmission case 9 by a snap ring 52 and teeth 9a formed on the inside surface of the transmission case 9. The second brake $B_2$ further includes an alternating pack of external brake plates 53 engaged with the brake drum 51, and internal brake plates 54 engaged with the brake hub 48. The second brake $B_2$ further includes a brake piston 55 which is slidably received in the brake drum 51. The second brake $B_2$ is applied when the brake piston 55 moves leftwards as viewed in FIG. 1 against the force of a return spring (not shown) by the action of a fluid pressure.

The third brake $B_3$ includes a brake drum 56, and an alternating pack of external brake plates 59 engaged with the brake drum 56 and internal brake plates 60 engaged with the third ring gear $6_R$ serving as a brake hub. The brake drum 56 surrounds the third planetary gear set 6, and is fit in the transmission case 9. The brake drum 56 is fixed to the transmission case 9 by a snap ring 57 and a member 58 for preventing rotation. The third brake $B_3$ further includes a double piston structure including pistons 61 and 62. The pistons 61 and 62 are separated from the brake drum 56, and slidably received in a piston chamber formed in the transmission case 9, around the left end portion of the output shaft 2. The pistons 61 and 62 move leftwards in FIG. 1 by the action of a fluid pressure against the force of a spring 63 when the third brake $B_3$ is applied. It is possible to employ such a double piston structure because the third brake $B_3$ is located at one end of the planetary gear train. This double piston structure provides a large clutch capacity, and enables reduction of the number of the brake plates.

In the planetary gear system according to this embodiment, the third planetary gear set 6 which is closest to the output shaft 2 is smallest in diametral size among the three planetary gear sets 4, 5 and 6. In general, the gear size of the planetary gear set is measured in terms of the engaging position of the teeth of the ring gear, without regard to the thickness of the ring gear (or the outside diameter of the ring gear). In other words, the diameter of the pitch circle of the third ring gear $6_R$ is smaller than that of either one of the first and second ring gears. Furthermore, the second planetary gear set 5 is smaller in diametral size than the first planetary gear set 4 which is closest to the input shaft 1. In the illustrated embodiment, the brake plates 53 and 54 are placed around the larger first planetary gear set 4, and the brake piston 55 is disposed around the smaller second planetary gear set 5. The brake plates 59 and 60 are placed around the third planetary gear set 6.

The transmission case 9 shown in FIG. 1 has a first case portion surrounding the pack of the brake plates 53 and 54 of the second brake $B_2$, a second case portion surrounding the brake piston 55 of the second brake $B_2$, a third case portion surrounding the pack of the brake plates 59 and 60 of the third brake $B_3$, and a fourth case portion surrounding the brake pistons 61 and 62 of the third brake $B_3$. The diameters of the first, second, third and fourth case portions are gradually decreased in a stepwise manner toward the right end as viewed in FIG. 1.

In the automatic transmission shown in FIG. 1, it is possible to regard the outer (left) end of the input shaft 1 as an input end of the transmission, and the outer (right) end of the output shaft 2 as an output end of the transmission.

In this automatic transmission, the planetary gear system and the engaging device group are enclosed in a transmission housing which comprises the transmission case 9 and other stationary members.

The three planetary gear sets 4, 5 and 6 are tightly and compactly arranged on the relatively short intermediate shaft 3 between the first and second ends of the intermediate shaft 3. There are no clutches and no brakes between the first and second planetary gear sets 4 and 5, and between the second and third planetary gear sets 5 and 6. Between the first planet carrier 4C and the second planet carrier 5C, there is provided a bearing having a first side fixed to the first planet carrier 4C and a second side fixed to the second planet carrier 5C. Another bearing is sandwiched between the second planet carrier 5C and the third planet carrier 6C. The planet carriers 4C, 5C and 6C are compactly arranged leaving intervening spaces which are too narrow to accommodate a clutch or a brake.

What is claimed is:

1. An automatic transmission comprising:
   an input shaft;
   an output shaft aligned with said input shaft;
   an intermediate shaft comprising a first end which is rotatably supported by an end of said input shaft, and a second end which is rotatably supported by an end of said output shaft;
   an engaging device group comprising first, second and third engaging devices which are all located on said input shaft; and
   a planetary gear system comprising first and second planetary gear sets which are both mounted on said intermediate shaft.

2. An automatic transmission according to claim 1 wherein said planetary gear system further comprises a third planetary gear set which is also mounted on said intermediate shaft.

3. An automatic transmission according to claim 1 wherein said device group further comprises two brakes which are located around said planetary gear sets.

4. An automatic transmission according to claim 1 wherein said planetary gear system further comprises a third planetary gear set, said first, second and third planetary gear sets being all mounted on said intermediate shaft between said first and second ends of said intermediate shaft, said second planetary gear set being located axially between said first and third planetary gear sets, and wherein said first engaging device includes a first clutch, said second engaging device includes a second clutch and said third engaging device includes a first brake placed around said input shaft, and said engaging device group further comprises second and third brakes each of which comprises a pack of brake plates surrounding one of said first, second and third planetary gear sets.

5. An automatic transmission according to claim 4 wherein said automatic transmission further comprises a transmission housing comprising an outer peripheral portion surrounding said planetary gear system and said device group, a first stationary support wall which projects inwardly from said peripheral portion toward said input shaft and which supports said input shaft, and a second stationary support wall which projects inwardly from said peripheral portion toward said output shaft and which supports said output shaft, said transmission housing comprises an interior hollow space bounded by said outer peripheral portion and said first and second support walls, said first, second and third planetary gear sets and said intermediate shaft being located within an imaginary right circular cylinder which is contained within said hollow space of said transmission case and which is coaxial with said intermediate shaft.

6. An automatic transmission according to claim 4 wherein said first planetary gear set comprises a first planet carrier, said second planetary gear set comprises a second planet carrier, said third planetary gear set comprises a third planet carrier, and said planetary gear system further comprises a first bearing disposed between said first and second planet carriers and a second bearing disposed between said second and third planet carriers.

7. An automatic transmission according to claim 4 wherein said first planetary gear set comprises a first sun gear connected with said input shaft, a first ring gear and a first planet carrier, said second planetary gear set comprises a second sun gear, a second ring gear connected with said first carrier and a second planet carrier, and said third planetary gear set comprises a third sun gear connected with said second sun gear, a third ring gear connected with said second carrier, and a third planet carrier connected with said output shaft, and wherein said engaging device group comprises said first clutch for connecting said input shaft with said second and third sun gears, said second clutch for connecting said input shaft with said second carrier and said third ring gear, said first brake for holding said first ring gear, said second brake for holding said first carrier and said second ring gear, and said third brake for holding said second carrier and said third ring gear.

8. An automatic transmission according to claim 7 wherein said first clutch comprises a first driven member which is driven by said input shaft when said first clutch is engaged, said second clutch comprises a second driven member which is driven by said input shaft when said second clutch is engaged, said first driven member is mounted on, and splined to, a first section of said intermediate shaft, said second driven member is rotatably mounted on a second section of said intermediate shaft, said second and third sun gears are integrated into a single piece which is mounted on, and splined to, a third section of said intermediate shaft, said second section of said intermediate shaft is a section extending axially between said first and third sections of said intermediate shaft, said first sun gear is rotatably mounted on said second driven member, and said second planet carrier comprises a first portion which is mounted on, and splined to said second driven member and which is placed between said first sun gear and said second sun gear.

9. An automatic transmission according to claim 8 wherein said second driven member comprises a first portion which abuts on said first driven member through a bearing, and a second portion which abuts on said second sun gear through a bearing.

10. An automatic transmission according to claim 1, wherein each of said first, second and third engaging devices comprises a cylindrical portion, said cylindrical portions of said first, second and third engaging devices and said input shaft being all concentric in an imaginary sectional plane perpendicular to said input shaft.

11. An automatic transmission according to claim 4, further comprising a transmission housing which encloses said planetary gear system and said engaging device group, said transmission housing comprising first and second radially extending support walls for rotatably supporting, respectively, said input and output shafts, wherein said transmission does not house a radially extending support wall for supporting said intermediate shaft between said first and second support walls.

12. An automatic transmission according to claim 4, wherein said first planetary gear set comprises a first ring gear, said transmission further comprises a rotating unit which comprises a first portion which is connected with said first ring gear so that said rotating unit and said first ring gear rotate together, and a second portion extending axially from said first portion and coaxially surrounding said input shaft, and said first and second clutches, and said third brake comprises a brake element for braking said rotating unit.

13. An automatic transmission according to claim 12, wherein said rotating unit comprises a connecting member comprising an inner portion connected with said first ring gear, and an outer portion which extends radially outwardly from said inner portion to an outer end of said rotating member, and a brake drum which extends axially from said outer end of said connecting member and which surrounds said first and second clutches.

14. An automatic transmission according to claim 5, wherein said engaging device group and said planetary gear sets are placed axially between said first and second stationary support walls.

15. An automatic transmission comprising:
an input shaft;
an output shaft aligned with said input shaft;
an intermediate shaft comprising a first end which is rotatably supported by an end of said input shaft, and a second end which is rotatably supported by an end of said output shaft;

an engaging device group comprising first and second clutches which are both located on said input shaft; and a planetary gear system comprising first and second planetary gear sets which are both mounted on said intermediate shaft;

wherein said planetary gear system further comprises a third planetary gear set, said first, second and third planetary gear sets being all mounted on said intermediate shaft between said first and second ends of said intermediate shaft, said second planetary gear set being located axially between said first and third planetary gear sets, and wherein said first engaging device includes a first clutch, said second engaging device includes a second clutch and said third engaging device includes a first brake placed around said input shaft, and said device group further comprises second and third brakes each of which comprises a pack of brake plates surrounding one of said first, second and third planetary gear sets; and wherein said first planetary gear set comprises a first planet carrier, said second planetary gear set comprises a second planet carrier, said third planetary gear set comprises a third planet carrier, and said planetary gear system further comprises a first bearing disposed between said first and second planet carriers and a second bearing disposed between said second and third planet carriers.

16. An automatic transmission comprising:
an input shaft;
an output shaft aligned with said input shaft;
an intermediate shaft comprising a first end which is rotatably supported by an end of said input shaft, and a second end which is rotatably supported by an end of said output shaft;
an engaging device group comprising first and second clutches which are both located on said input shaft; and
a planetary gear system comprising first and second planetary gear sets which are both mounted on said intermediate shaft;
wherein said planetary gear system further comprises a third planetary gear set, said first, second and third planetary gear sets being all mounted on said intermediate shaft between said first and second ends of said intermediate shaft, said second planetary gear set being located axially between said first and third planetary gear sets, and wherein said first engaging device includes a first clutch, said second engaging device includes a second clutch and said third engaging device includes a first brake placed around said input shaft, and said device group further comprises second and third brakes each of which comprises a pack of brake plates surrounding one of said first, second and third planetary gear sets;

wherein said first planetary gear set comprises a first sun gear connected with said input shaft, a first ring gear and a first planet gear and a first planet carrier, said second planetary gear set comprises a second sun gear, a second ring gear connected with said first carrier and a second planet carrier, and said third planetary gear set comprises a third sun gear connected with said second sun gear, a third ring gear connected with said second carrier, and a third planet carrier connected with said output shaft, and wherein said engaging device group comprises said first clutch for connecting said input shaft with said second and third sun gears, said second clutch for connecting said input shaft with said second carrier and said third ring gear, said first brake for holding said first ring gear, said second brake for holding said first carrier and said second ring gear, and said third brake for holding said second carrier and said third ring gear; and wherein said first clutch comprises a first driven member which is driven by said input shaft when said first clutch is engaged, said second clutch comprises a second driven member which is driven by said input shaft when said second clutch is engaged, said first driven member is mounted on, and splined to, a first section of said intermediate shaft, said second driven member is rotatably mounted on a second section of said intermediate shaft, said second and third sun gears are integrated into a single piece which is mounted on, and splined to, a third section of said intermediate shaft, said second section of said intermediate shaft is a section extending axially between said first and third sections of said intermediate shaft, said first sun gear is rotatably mounted on said second driven member, and said second planet carrier comprises a first portion which is mounted on, and splined to said second driven member and which is placed between said first sun gear and said second sun gear.

17. An automatic transmission according to claim 16, wherein said second driven member comprises a first portion which abuts on said first driven member through a bearing, and a second portion which abuts on said second sun gear through a bearing.

* * * * *